Oct. 6, 1964  J. VESAK  3,151,801
BASKET AND HANDLE
Filed Feb. 26, 1963  2 Sheets-Sheet 1
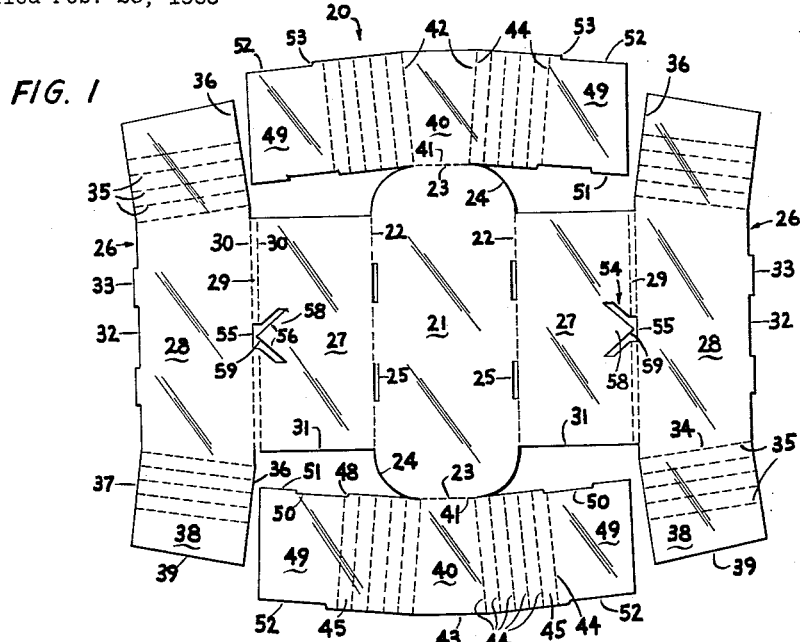
FIG. 1
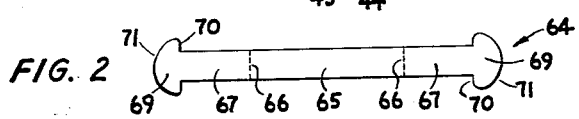
FIG. 2
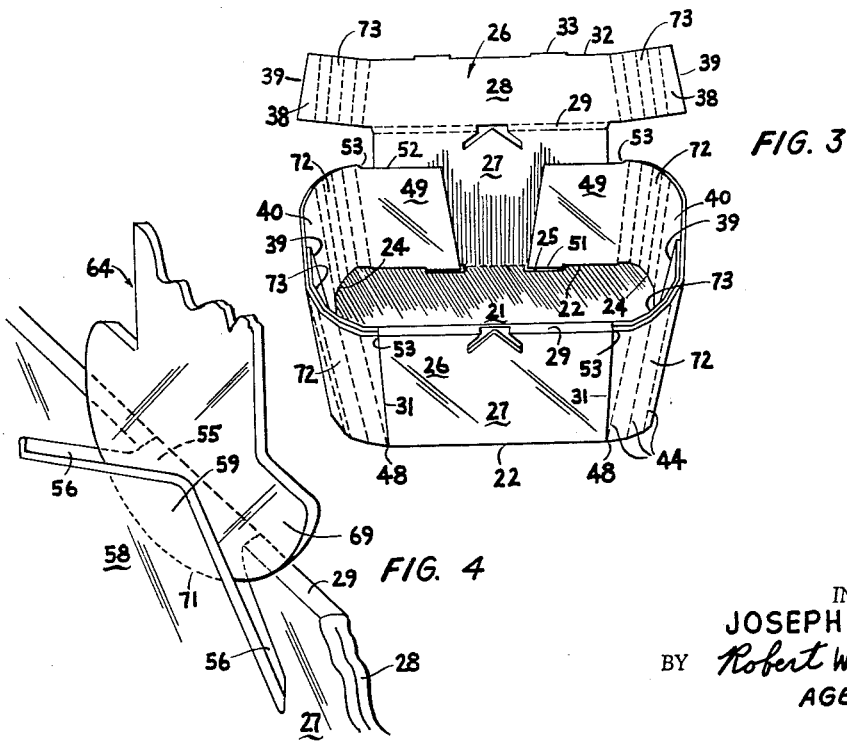
FIG. 3
FIG. 4
INVENTOR.
JOSEPH VESAK
BY Robert W. Brukardt
AGENT Oct. 6, 1964   J. VESAK   3,151,801
BASKET AND HANDLE
Filed Feb. 26, 1963   2 Sheets-Sheet 2
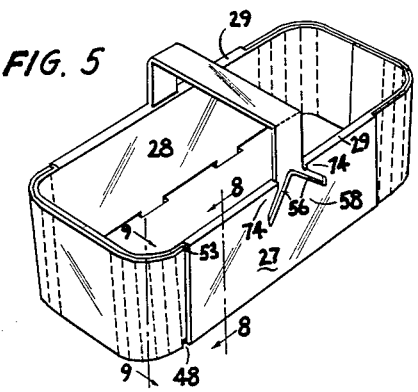
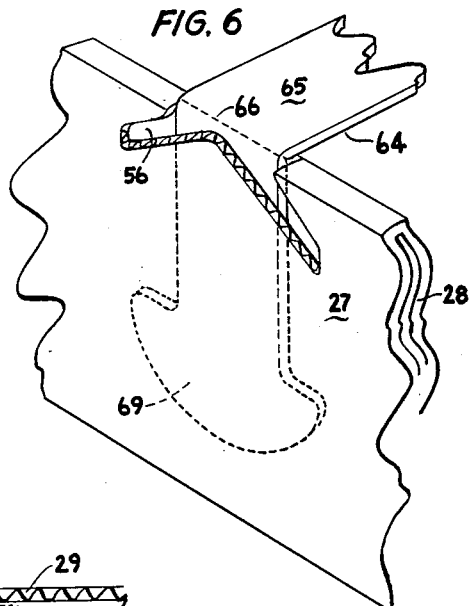
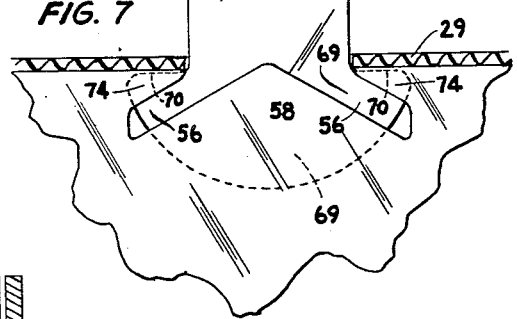
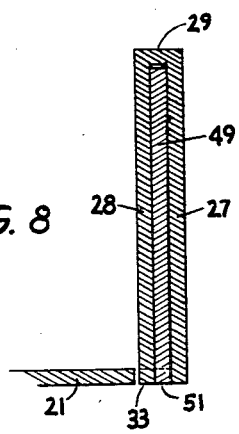
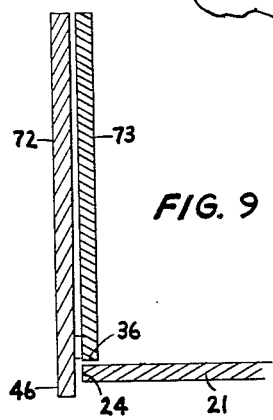
INVENTOR.
JOSEPH VESAK
BY *Robert W. Burkhardt*
AGENT 3,151,801
BASKET AND HANDLE
Joseph Vesak, Richmond, British Columbia, Canada, assignor to Crown Zellerbach Canada Limited, Vancouver, British Columbia, Canada, a corporation of British Columbia
Filed Feb. 26, 1963, Ser. No. 261,105
11 Claims. (Cl. 229—34)

This invention relates to a handled basket formed from foldable paperboard or the like.

More particularly, the invention provides a basket with handle wherein the basket has the traditional outwardly flared walls as commonly encountered with wood veneer baskets to permit nesting of the basket prior to the filling thereof. Such baskets are commonly used for fruits and vegetables although they are not limited to such usage. In comparison to wood veneer baskets, the present invention affords the advantages of a paperboard construction characterized by smooth surfaces free of splinters, cushioning qualities, and adaptability to attractive printing. Additionally, the invention permits the shipment and storage of the basket parts in a flat condition, permits easy erection by manual means after which the baskets may be nested for ease of handling or storage prior to filling, and finally the invention provides means for inserting and engaging a telescoping handle member which provides a heretofore unrealized convenience.

The handle insertion and engaging means allows the handles to be inserted, either before or after filling the baskets, by a simple straight line motion without significantly distorting or twisting the basket walls or handle member. The simplicity of the handle insertion operation affords economy in labor and avoids any possibility of disarranging or otherwise impairing the arrangement of fruit or the like in the basket.

These and other advantages and objects of the invention will be more readily apparent upon the examination of the detailed description in conjunction with the drawings in which:

FIGURE 1 is a plan view of a foldable blank embodying the invention;

FIGURE 2 is a plan view of a handle member;

FIGURE 3 is a perspective view of a basket in an intermediate stage of assembly;

FIGURE 4 is an enlarged detail of a section of the basket showing the handle insertion and engaging means with the handle partially inserted;

FIGURE 5 is a perspective view of the erected basket with the handle member in extended position;

FIGURE 6 is an enlarged detail of a section of the basket showing the handle in recessed condition;

FIGURE 7 is an enlarged detail, illustrating diagrammatically the disposition of the handle in extended carrying position;

FIGURE 8 is a cross-sectional view taken along line 8—8 of FIGURE 5 showing the basket side wall construction with adjacent bottom panel portions;

FIGURE 9 is a cross-sectional view through line 9—9 of FIGURE 5 showing the construction of the curvilineal corner portions of the basket in conjunction with adjacent bottom panel portions.

The blank 20 shown in FIGURE 1 may be die cut from a rectangular sheet of corrugated paperboard or other suitable bendable material and scored as indicated by dotted lines to determine an arrangement of panels to form a basket embodying the present invention. The blank 20, described in terms equally applicable to the basket formed therefrom, includes a bottom panel 21 with longitudinal side edges 22. The transverse end edges 23 determine the ends of the bottom panel 21.

Curvilineal corner edges of the bottom panel are indicated at 24. Locking tab slots 25 are cut in the bottom panel 21 adjacent the longitudinal side edges 22. The side wall 26 portions of the blank are hingedly connected to the bottom panel by the bottom score 22 which determines the before mentioned longitudinal side edges.

The side wall portions 26 include outer panel 27 and inner panel 28 which are joined together at their top edges by top fold 29. The top fold 29 is preferably determined by spaced apart lines of scoring 30 which may be impressed on the inner surface of the blank or perforated to facilitate the folding thereof. The outer panel 27 has free end edges 31 determining the end extremities of the linear longitudinal side edges 22 and the curvilineal corner edges 24.

The inner panel 28 has a free bottom edge 32 which includes locking tabs 33. The locking tabs 33 are in aligned relation and of a conformation to be insertable in the respective locking tab slots 25. The inner panel 28 is of a generally trapezoidal conformation having angulated end edges 34 determined by the first one of a series of corner contour scores 35. The corner contour scores 35, which determine the segments of the inner curvilineal corner portions of the basket walls may be in spaced apart parallel relation as shown for practical convenience, although such score lines may be arranged whereby they flare apart towards the upper margins of the container. This inner curvilineal corner portion includes bottom edge 36 and top edge 37 which are angulated in respect to the top and bottom edges 30 and 32 of inner panel 28 to adapt the structure to the flared wall conformation of the basket. The inner curvilineal corner wall portion is terminated in inner end wall panels 38 which have free end edges 39.

Continuing with FIGURE 1 the outer end wall panel 40 is foldably connected to the bottom panel 21 by the bottom score 41 which determines the before mentioned transverse end edges. The outer end wall panel 40 is generally trapezoidal in shape having angulated side edges 42 which flare outwardly towards the top edge 43. The angulated side edges 42 are determined by the first of a series of corner contour scores 44. The arrangement and conformation of the outer corner contour scores is such that the included wall portion will adapt in the erected basket to a substantially concentric curve extending outwardly of the wall portion determined by the inner wall corner contour scores 35. A convenient means of doing this is to include one additional segment 45 in the curvilineal wall portion. The curvilineal portion has a bottom edge 46 and top edge 47 which are angulated in respect to the adjacent bottom score 41 and top edge 43. In addition, the bottom edge 46 is angled downwardly an additional amount to extend below the curvilineal corner edge 24 of the bottom panel as will be explained hereinafter in regard to the erected container. This additional downward projection of the bottom edge 46 is terminated by a bottom offset 48.

Intermediate side wall panels 49 are connected to the last of the outer corner contour scores 44 on each side of the end wall panels 40. The bottom edge 50 of the intermediate side wall panels 49 is provided with a projecting locking tab 51 adapted to engage in the respective locking tab slots 25 of the bottom panel 21. The top edges of the intermediate panels 49 have a recessed portion 52 which is terminated in a top offset 53 which is in spaced relation to the last of the corner contour scores 44.

The handle inserting and engaging means of the container blank is shown generally at 54 and is comprised of a slot 55 generally disposed in the top fold 29 of the side walls 26. The slot is co-extensive in length with the width of the upright sides 67 of the handle member 64, as described, in regard to FIGURE 2, hereinafter.

Angular slots 56 extend from an edge of the slot 55 and are terminated in end edges 57. The angular slots 56 are shown in the outer side wall panel 27 but may be disposed in a like manner in the inner panel 28. A triangular wall portion 58 having an apex 59 is determined by the angular slots 56. The apex 59 extends above the top edge of the outer panel 27.

FIGURE 2 shows a plan view of a handle member 64 which includes a central gripping portion 65 which is foldably connected by scores 66 to upright sides 67. The upright sides 67 have side edges 68. The upright sides 67 are terminated in bottom ends which are engaging tabs 69. The engaging tabs have upper edges or shoulders 70 in substantially perpendicular relation to the side edges 68. The end edges 71 of the engaging tabs 69 are preferably of a generally arcuate conformation.

The method of assembly of the basket is apparent in FIGURE 3 whereby it may be seen that the outer end wall panels 40 are folded upwardly from the plane of the blank and the outer curvilineal corner portions 72 of the walls folded about the corner contour scores 44 in conformity with the curvilineal corner edges 24 of the bottom panel 21 whereby the intermediate side wall panels 49 are disposed adjacent the longitudinal side edges 22 with the locking tab 51 thereof engaged in the bottom locking tab slots 25. Thereafter the side walls 26 are folded upwardly until there is flatwise engagement between the intermediate side wall panels 49 and the side wall outer panels 27. Following which the inner side wall panel 28 is folded about the top fold 29 until the bottom edge 32 is disposed adjacent the bottom panel 21 with locking tabs 33 engaged in the locking tab slots 25. Finally, the end edges 39 of the inner end wall panels 38 are brought into mutual abutting edgewise relation at each end of the basket to retain the inner curvilineal wall portions 73, determined by the corner contour scores 35, in the desired upwardly flared curved corner disposition in concentric relation to the outer curvilineal wall portions 72, without the necessity of resorting to extraneous fastening means. This is best shown in FIGURE 5.

To insert the handle member 64, as shown in FIGURE 4, the end edge thereof 71 may be impressed against the apex 59 to slightly deflect the triangular wall portion 58 so that the engaging tabs 69 may be inserted in a straight line movement through the slot 55 and angular slots 56 until the engaging tabs 69 are confined wholly within the side wall panels 27-28 and top fold 29. The handle may be fully depressed within such confines as shown in FIGURE 6 until the central gripping portion 65 rests on the top edge of the side walls. In this position the container may be conveniently stacked for shipment or storage without interference from the handle.

In the extended carrying position of the handle as shown in FIGURES 5 and 7, the shoulders or upper edge 70 of the handle engaging tab 69 are disposed abutting the inner surface of the top fold 29. In this position the triangular wall portion 58 and wall portions 74, intervening the angular slots 56 and the top fold, retain the handle engaging tabs 69 in restricted confinement within the container walls to assure safe carrying of the basket without fear of dislodgement and without the need of resorting to extraneous fastening means such as staples.

It is to be noted in regard to the cross sectional view in FIGURE 8 that the top fold 29 is of a width to accommodate the intervening wall portion 49 between the outer and inner side wall panels 27-28. Further, the intervening wall portion 49 and side wall inner panel 28 are each confined in their flatwise wall relation adjacent the side wall outer panel 27 by the engagement of their respective locking tabs 33 and 51 in the bottom panel locking tab slots 25. Additionally it is to be noted that the top edge recessed portion 52 of the intermediate side panel 49 abuts the inner surface of the top fold 29. This abutting relationship in combination with the engagement of the locking tab 51 in the locking tab slots 25 prevent the outward dislodgement of outer end wall panel 40, and outer curvilineal wall portions 72.

The cross sectional view through the outer curvilineal corner portion 72 and inner curvilineal corner portion 73 of the walls very particularly shows the engagement of the outer portion 72 downwardly extending bottom edge 46 with the curvilineal corner edges 24 of the bottom panel 21. Whereas, the bottom edge 36 of the inner curvilineal wall corner portion rests upon the marginal edges of said bottom curvilineal corner edges 24 and thus the inner curvilineal wall portions 73 are determined in their wall formation by the edgewise abutment of the inner end wall panel free end edges 39. Additionally, the bottom edge offsets 48 and top edge offsets 53 abut the bottom edges 22 of the outer side wall panels and top fold 29 to resist inward deflection of the thus determined outwardly flaring and curved walls of the basket.

In accordance with the foregoing, the applicant's invention resides in a basket formed from a flat blank of foldable material which is folded and integrally locked without extraneous fastening materials by a simple manual operation to form a basket with upwardly and outwardly flaring sides and rounded corners, said basket being further provided with novel means for inserting a handle in a straight line movement, which handle attains a locking engagement with the basket without use of extraneous fastening materials and which handle is further movable from a flat recessed condition for stacking or extended for carrying without requiring any manipulation of the fastening structures.

It is to be understood that the embodiment of the invention herein described is illustrative and not restrictive, and the invention may be susceptible to embodiment in other modified forms. All such modifications which are similar to or equivalent hereto come equally within the scope of the claims next appearing.

The embodiments of the invention in which an exclusive property or privilege is claimed, are defined as follows:

1. A basket having side walls each including inner and outer panels connected by top folds and a handle member having a central gripping portion, upright sides and engaging tabs with shoulders for engaging the interior of the top folds of the side walls; a slot in each said top fold coextensive in length with the width of the handle upright sides, a pair of angular slots extending downwardly and laterally from each said top fold slot, said paired angular slots each determining therebetween a substantially triangular side wall portion, the bottom end extremities of the angular slots being spaced apart a distance at least equal to the width of the respective handle engaging tab, said triangular side wall portions deflectable from the plane of the respective wall panels to permit vertical insertion of the handle engaging tabs between the respective inner and outer side wall panels.

2. A basket according to claim 1 wherein the handle upright sides are parallel and slidable in the top fold slot, the handle being extendable from a recessed position with the central gripping portion resting on the tops of the side walls to an extended carrying position wherein the engaging tabs abut the inner surface of the top fold, the engaging tabs being confined in the basket walls by the triangular wall portions and wall portions intervening the angular slots and the top folds.

3. A basket having side walls including inner and outer panels connected at their top edges by a top fold and a handle member having a central gripping portion, upright sides and engaging tabs with shoulders for engaging the interior of the top folds of the side walls; a slot in the top folds coextensive in length with the width of the handle upright sides, a pair of angular slots extending downwardly and laterally from each top fold slot, said paired angular slots each determining therebetween substantially triangular wall portions, the triangular wall portions having apexes which extend above the side wall top edges and being deflectable from the plane of the respective wall panel to permit vertical insertion of the handle engaging tabs between the respective inner and outer side wall panels.

4. A basket according to claim 3 wherein the handle upright sides are parallel and slidable in the top fold slot, the handle being extendable from a recessed position with the central gripping portion resting on the tops of the side walls to an extended carrying position wherein the engaging tabs abut the inner surface of the top fold, the engaging tabs being confined in the basket walls by the triangular wall portions and wall portions intervening the angular slots and the top folds.

5. A basket according to claim 3 wherein the angular slots have bottom end extremities with said end extremities spaced apart a distance at least equal to the width of the respective handle engaging tabs.

6. A basket formed from a foldable blank, the basket having a bottom panel with free curvilineal corner edges and a wall foldably connected and extending upwardly from side and end edges of the bottom panel, the wall comprising inner and outer side wall panels, end wall panels, and curvilineal corner ports, said curvilineal corner portions each determined by a series of corner scores in spaced apart relation, the curvilineal corner portions having substantially concentric inner and outer walls with the inner curvilineal wall portions each being foldably connected to a side wall panel and the outer curvilineal wall portions each being connected to an end wall panel, intermediate side wall panels foldably connected to said outer curvilineal wall portions in locked engagement between the side wall inner and outer panels, the inner curvilineal wall panels having inner end wall panels connected thereto, said inner end wall panels having free end edges in edgewise abutting relationship with an opposite inner end wall panel free end edge at each end of the container maintaining the inner curvilineal walls in contacting relation to the outer curvilineal wall portions.

7. A basket having a bottom panel with free corner curvilineal edges and a wall foldably connected and extending upwardly from the side and end edges of the bottom panel, said wall comprising inner and outer side wall panels, end wall panels, and curvilineal corner portions, said curvilineal corner portions disposed adjacent the curvilineal corner edges of the bottom panel, said curvilineal corner portions having substantially concentric inner and outer walls with the inner curvilineal wall portions each being foldably connected to a respective inner side wall panel and having a bottom edge resting on the marginal edge of bottom panel curvilineal corner edges while the outer curvilineal wall portions are each connected to a respective end wall panel and have a downwardly extending bottom edge engaging the bottom panel curvilineal corner edge to prevent inward deflection of said wall.

8. A basket according to claim 7 wherein the side walls comprise inner and outer panels, with a top fold connection therebetween, intermediate side wall panels disposed between said inner and outer panels, said intermediate side wall panels each being connected to an outer curvilineal wall portion and having recessed top edges in abutment with the inner surface of the top folds, an offset adjacent the recessed top edge in abutment with the top fold.

9. A basket according to claim 8 wherein inner end wall panels are connected to the inner curvilineal wall portions, said inner end wall panels each having free end edges in edgewise abutting relationship with an opposite inner end wall panel free end edge at each end of the basket.

10. A basket according to claim 8 wherein slots in the side walls are adapted to engage a handle member, the handle member having a central gripping portion, generally upright sides and end tabs with shoulders for engaging the interior of the top folds of the side walls, a pair of slots in the top folds coextensive in length with the width of the handle upright sides, a pair of angular slots extending downwardly and laterally from each said top fold slot, said paired angular slots each determining therebetween substantially triangular side wall portions, the bottom end extremities of the angular slots being spaced apart a distance substantially equal to the width of the handle end tabs.

11. A basket with an extendable handle, the basket having a bottom panel with side, end, and curvilineal corner edges and a wall extending upwardly from said edges, the wall flaring outwardly from its bottom edge and having curvilineal corners, the wall comprising inner and outer side panels and end panels, curvilineal corner portions and intermediate side wall panels, the inner and outer side wall panels being connected together by a top fold and the outer side wall panels foldably connected to the bottom panel side edges, the outer end panels being foldably connected to the bottom panel end edges, the inner and outer curvilineal corner wall portions having free bottom edges with said inner curvilineal corner wall portion bottom edges resting on the bottom panel corner edges and said outer curvilineal wall portions having downwardly extending edges engaging the edge of the bottom panel, intermediate wall panels foldably connected to the ends of the outer curvilineal wall portions, said outer curvilineal wall portions and intermediate wall panels having offsets in their top and bottom edges engaging the ends of the outer side wall panels and top folds, the intermediate wall panels having top edges abutting the inner surface of the top folds and bottom edge locking tabs disposed in bottom panel locking slots thus securing the outer curvilineal wall portions in fixed relation.

References Cited in the file of this patent

UNITED STATES PATENTS

| | | |
|---|---|---|
| 665,731 | Engberg | Jan. 8, 1901 |
| 1,158,699 | McCleery | Nov. 2, 1915 |
| 2,574,998 | Bangert | Nov. 13, 1951 |
| 2,632,595 | Finkbone | Mar. 24, 1953 |